United States Patent [19]

Davis et al.

[11] Patent Number: 5,420,888
[45] Date of Patent: May 30, 1995

[54] SYSTEM AND METHOD FOR SPLIT PHASE DEMODULATION OF FREQUENCY SHIFT KEYED SIGNALS

[75] Inventors: Gordon T. Davis, Raleigh, N.C.; Baiju D. Mandalia, Boca Raton; John C. Sinibaldi, Pompano Beach, both of Fla.

[73] Assignee: International Business Machines Corporation, Armonk, N.Y.

[21] Appl. No.: 886,676

[22] Filed: May 21, 1992

[51] Int. Cl.⁶ ............................................. H04L 27/14
[52] U.S. Cl. .................................... 375/334; 329/300
[58] Field of Search .................... 375/88, 91, 78, 44, 375/45, 98, 94, 90, 89, 47, 48; 329/300; 331/179

[56] References Cited

U.S. PATENT DOCUMENTS

| | | | |
|---|---|---|---|
| 4,388,595 | 6/1983 | Brooks | 375/88 |
| 4,423,519 | 12/1983 | Bennett, Jr. et al. | 329/300 |
| 4,481,642 | 11/1984 | Hanson | 375/88 |
| 4,568,882 | 2/1986 | Single | 375/91 |
| 4,716,376 | 12/1987 | Dandelin | 329/300 |
| 4,726,041 | 2/1988 | Prohaska et al. | 329/300 |
| 5,040,192 | 8/1991 | Tjahjadi | 375/88 |
| 5,128,966 | 7/1992 | Bang | 375/88 |
| 5,241,566 | 8/1993 | Jackson | 375/91 |

*Primary Examiner*—Stephen Chin
*Assistant Examiner*—Hai H. Phan
*Attorney, Agent, or Firm*—Bernard D. Bogdon; Andrew J. Dillon

[57] ABSTRACT

A system and method for efficient operation of a digital signal processor allows execution of a noncoherent FSK demodulation process at the baud rate of the incoming signal. First and second signal detecting channels terminate at a summing junction. A signal sampler for applying a sampled signal to the first and second signal detecting channels. The first and second signal detecting channels each include, in series, a finite impulse response filter for filtering out energy outside a selected bandwidth, automatic gain control and a demodulator. The finite impulse response filter means for the second signal detecting channel further shifts the phase of the sampled signal in the second signal detecting channel approximately 90 degrees relative to the sampled signal in the first signal detecting channel. The demodulator in each signal detecting channel further includes first and second sampled signal transmission paths terminating in a multiplying junction. The first signal transmission path in each demodulator includes a tunable delay line. The decoder takes its input from the summing junction for reproducing a signal indicating presence of a particular frequency or reproduction of the baseband signal.

7 Claims, 7 Drawing Sheets

SYSTEM AND METHOD FOR SPLIT PHASE DEMODULATION OF FREQUENCY SHIFT KEYED SIGNALS

CROSS-REFERENCE TO RELATED APPLICATION

The present application contains subject matters related to co-pending application Ser. No. 07/886,674 now U.S. Pat. No. 5,263,054, entitled Method And System For Interpolating Baud Rate Timing Recovery For Asynchronous Start Stop Protocol, filed on even date herewith and assigned to the assignee hereof and incorporated by reference herein.

BACKGROUND OF THE INVENTION

1. Technical Field

The invention relates to data communication and more particularly to a system and method for the robust detection/demodulation of a frequency shift keyed signal. Still more particularly, the invention relates to a system and method for the efficient utilization of a digital signal processor for the demodulation of a plurality of frequency shift keyed signals.

2. Description of the Related Art

Frequency shift keying ("FSK") is a common digital modulation technique used for data transmission. Various signal frequencies are selected to represent predetermined values. In frequency shift keying for binary data transmission (i.e. the transmission of 1's and 0's), the instantaneous frequency of an output signal is shifted back and forth between two discrete values, sometimes called the mark and the space frequencies. Each frequency value corresponds to one of the two binary values: typically the mark frequency value corresponds to 1 and the space frequency corresponds to zero.

Frequency shift keying is often selected for data transmission through mediums where the signal strength is subject to unpredictable variation, such as occurs in radio transmission or telephone transmission over analog (e.g. two-wire pair) transmission lines. Frequency shift keying is favored for low to medium rate data transmission in extremely low cost MOdulator/DEModulators ("Modems"). The advantages of frequency shift keying are seen in radio and two wire pair transmission. Because information is transmitted in frequency changes, there is increased immunity to amplitude nonlinearities. Also, with frequency shift keying there is no need for carrier phase recovery thus simplifying recovery of the modulating signal.

Frequency shift keying belongs to a class of signals subject to noncoherent demodulation or detection. Noncoherent detection has generally meant envelope detection of a signal. At first examination, it may seem surprising that frequency shift keying can be subjected to envelope detection. Frequency shift keying is generally viewed as a digital form of frequency modulation. Classical analog detection has accordingly involved applying the received signal to parallel band pass filters tuned to the mark and the space frequency, respectively. The output of each band pass filter is applied to an envelope detector, and the respective output signals of the envelope detectors are subjected to subtraction of one of the envelope detector output signals from the other by use of a summer. Analog to digital conversion of the output of the summer recovers the binary information.

Digital signal processors ("DSP") are a type of dedicated microprocessor which provide real time processing of one or more digital signals taken from one or more logical or physical channels. A digital signal processor may be programmed to operate as a circuit metaphor for an analog device. (Depending upon device capacity, each signal may be applied to a different analog device metaphor.) It can readily be seen that digital signal processors are extremely flexible tools for signal processing. However, direct application of a metaphor for the classical frequency shift keying detection circuit, while possible, imposes substantial computational loading of the digital signal processor.

An example of a prior art frequency shift keying demodulator as realized on a digital signal processor is illustrated in an article entitled, Implementation of an FSK Modem Using the TMS320C17, by Evans et al., at page 356 of Digital Signal Processing Applications with the TMS 320 family (Vol. 2) (Copyright 1990 Texas Instruments). In essence, a received signal R(t) is multiplied with a delayed version of itself. The resultant signal is subjected to filtering to remove a double frequency component. The sign of the output of the low-pass filter indicates the current value of the received data.

The high computational loads seen in prior noncoherent frequency shift keyed detectors realized on digital signal processors can be explained by reference to sampling theory. Digital signal processors, being digital computers, operate on discrete representations of value. Analog signals are continuous. Discrete representations of an analog signal are provided the digital signal processor periodically sampling the continuous process to provide a set of numbers which equal instantaneous values assumed by the process. Critical to the sampling process is determination of the type of sampling to be done and the sampling period T required to supply sufficient information to the computer to accurately and reliably reflect the true nature of the continuous process. In other words, sufficient data must be collected from the continuous process to allow someone looking at the collected data to reproduce the original waveform. Sampling theory allows determination of the minimum number of such sampling points. This in turn determines the minimum computational load, as relates to one channel, for the digital signal processor. Determination of the appropriate sampling rate is complicated in application to detection and demodulation of frequency shift keying because of the generation of spurious harmonic signals.

Noncoherent demodulation of frequency shift keyed signals typically requires computation of the receiving digital signal processor demodulating process at a sample rate 8 times or greater than the baud (bits per second) rate. The high sampling rate is required to allow post detection filtering of harmonic frequency components generated by filtering dictated by the classical process as taught by Evans et al. above. While the technique works well, post detection filtering complicates the process, which still requires sample rate processing at a high sample rate.

SUMMARY OF THE INVENTION

It is therefore one object of the invention to provide an improved system and method for the robust demodulation of frequency shift keyed signals.

It is another object of the invention to provide a system and method for the robust demodulation of a plurality of frequency shift keyed signals utilizing a digital signal processor.

It is yet another object of the invention to provide an improved system and method for data communication.

The foregoing objects are achieved as is now described. A system and method for frequency discrimination provides first and second signal processing paths terminating at a summing junction. A signal sampler for applying a sampled signal to the first and second signal processing paths. The first and second signal processing paths each include, in series, a finite impulse response filter for filtering out energy outside a selected bandwidth, automatic gain control and a detection section. The finite impulse response filter means for the second signal processing path further shifts the phase of the sampled signal in the second signal processing path approximately 90 degrees relative to the sampled signal in the first signal processing path. The detection section in each signal processing path further includes first and second sampled signal paths terminating in a multiplying junction. The first subpath in each detection section includes a tunable delay line. The decoder takes its input from the summing junction for reproducing a signal indicating presence of a particular frequency or reproduction of the baseband signal.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
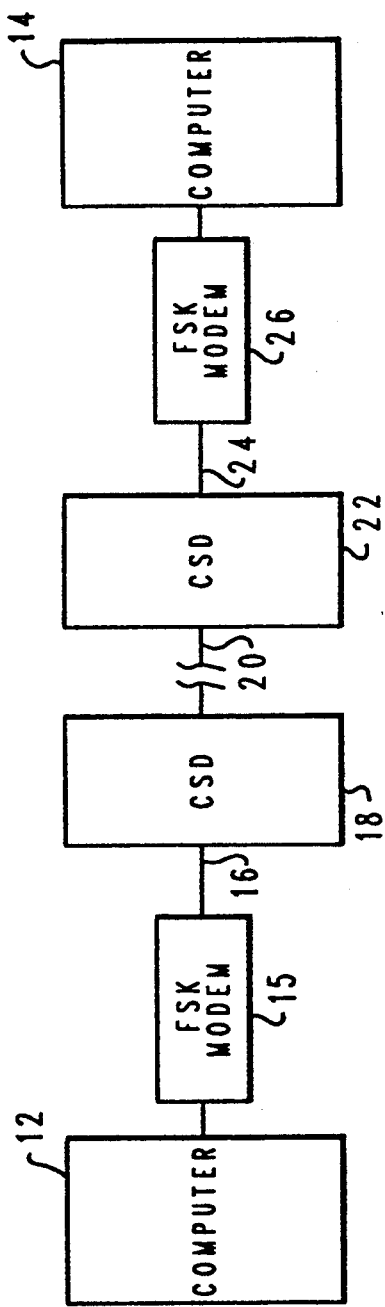
FIG. 1 is a high level block diagram of a data transmission link with which the present invention may be practiced.

With reference now to the figures and in particular with reference to FIG. 1, there is depicted a communications link 10 between computers 12 and 14. Communications link 10 comprises a frequency shift keying modem 15 for converting binary data generated by computer 12 in a frequency shift keyed signal suitable for transmission over telephone line 16 to local central switching office 18. At local central switching office 18 the signal is typically converted to a compressed pulse code modulated digital signal for transmission over long line connection 20 to a second local central switching office Transmission lines between central switching offices and a subscriber may support digital pulse code modulated signals (e.g. T1 transmission lines) or may support analog transmission only (e.g. two wire pair). Depending upon the nature of transmission line 24 local central switching office 22 may reconvert the compressed pulse code modulated signal back to frequency shift keyed signal for transmission over, for example, a two-wire pair telephone line, or central switching office 22 may apply the compressed pulse code modulated signal to a T1 transmission line. Frequency shift keying modem 26 demodulates the signal coming in on line 24 and provides the demodulated signal to computer 14.

In the following discussion the words detection and demodulation are both used respecting the process of frequency shift keying modem 26 employed upon receipt of a signal. Strictly used, detection is a broader term encompassing demodulation. Thus detection is defined as the determination of the presence of a signal and demodulation is defined as the process of recovery of a modulating wave in response to receipt of a modulated wave.

Figure 2:
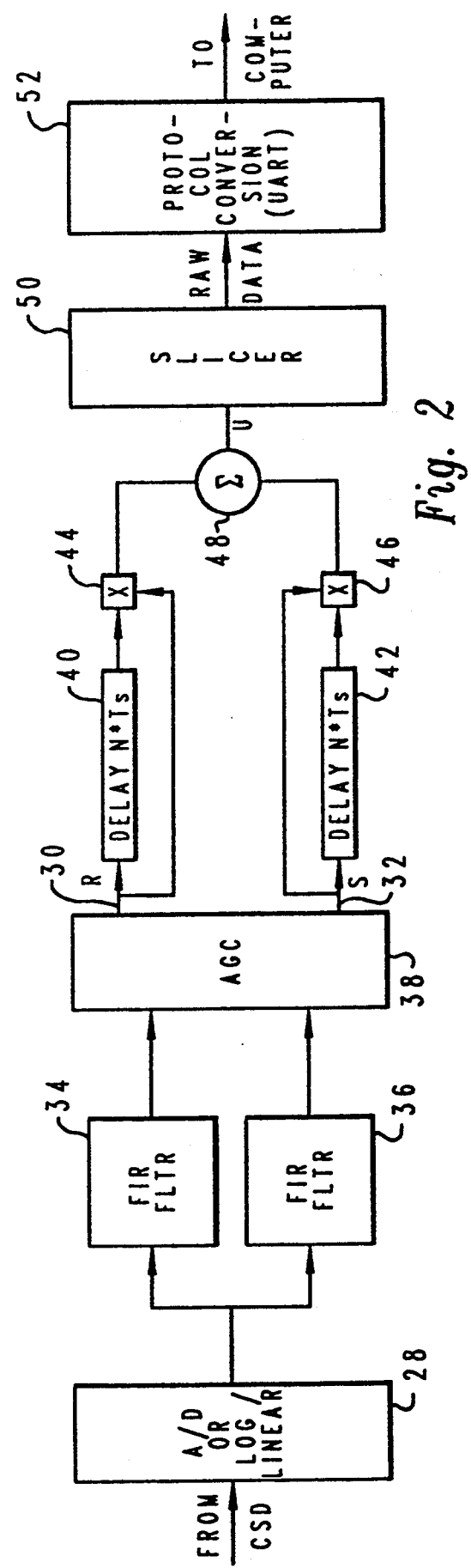
FIG. 2 is a block diagram of a circuit metaphor for detection of frequency shift keyed signals.

FIG. 2 is a block diagram illustrating the functions and relationships between functions of a frequency shift keying demodulation process suitable for execution on a digital signal processor. The block diagram may be considered as a metaphor for a frequency shift keying detection/demodulating circuit for modem 26. The first function to be executed for demodulation depends upon the nature of the received signal. The frequency shift keyed signal may be received as digitized pulse code modulated data or as an analog signal. If the signal is analog, an analog to digital converter 28 provides signal sampling and converts the signal into a 13 bit signed data. If the signal is digitized, compressed pulse code modulated data, a log/linear converter 28 is utilized to convert the signal from 8 bit format into 13 bit signed data. In this latter case, the telephone central switching office has essentially provided analog to digital conversion of the original frequency shift keyed signal. In either case, the output (hereafter the sampled signal) of analog to digital converter 28 or log/linear converter 28 is equivalent.

The sampled signal is applied along two branches or processing channels 30 and 32. Each processing channel includes a finite impulse response (FIR) filter, FIR filters 34 and 36, respectively. The output of FIR filter 34 is termed the real sampled signal, while the output of FIR filter 36 is termed the imaginary (a phase shifted) sampled signal. In each channel the FIR filter operates to filter out the energy components of the received signal outside a predetermined bandwidth. FIR filters 34 and 36 also operate as interpolating filters in that they increase the sampling rate of the sampled signal. In a preferred embodiment 8000 samples per second are received or taken. With interpolation, the apparent sampling rate is tripled to 24000 samples per second. Two additional estimated sample or interpolation points are added between each actual sample.

Figure 3:
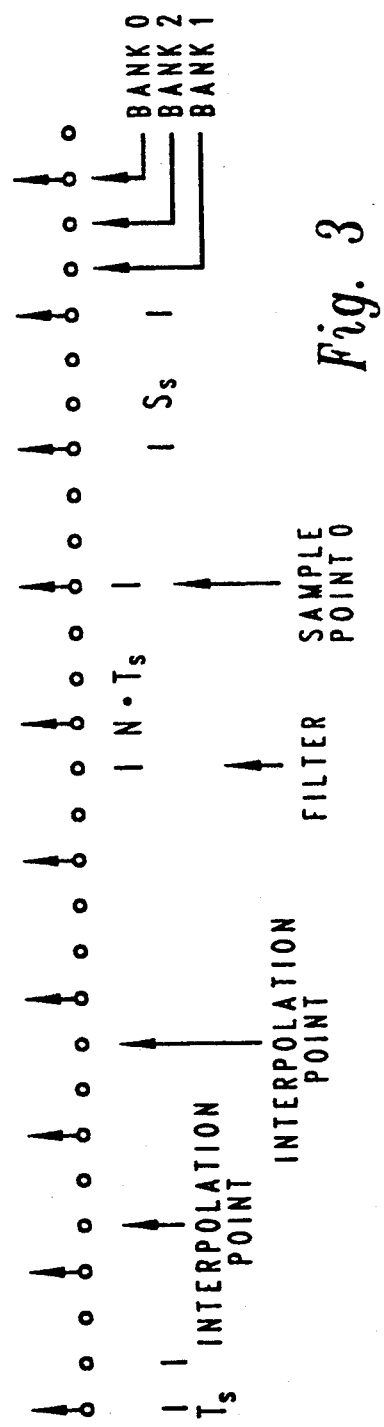
FIG. 3 is a graphical illustration of relative timing of sampled and interpolated points for a received signal.

FIG. 3 illustrates the interpolation function of the FIR filters. In the figure, $T_s$ is the interpolation period, $S_p$ is the sample period, sample points are indicated by upwardly directed arrows from circular bases, interpolation points are simple circles, and $N*T_s$ is the optimal delay period.

Returning to FIG. 2, FIR filter 36 also acts as a Hilbert filter, shifting the phase of the sampled signal by approximately 90 degrees relative to real signal of processing channel 30.

The outputs of FIR filter 34 and FIR filter 36, the real (R) and the imaginary, phase shifted (S) signals, respectively, are applied to a automatic gain control (AGC) block 38. Automatic gain control 38 provides that the signals S and R have a constant peak amplitude, or power output. Automatic gain control can compensate for uneven degradation between the mark and space frequencies, as can occur on a local loop.

The signals S and R are then applied to tunable delay lines 40 and 42, respectively. The delay period for each line is expressed as $N*T_s$, where N is an integer and $T_s$ is the interpolation period (in the preferred embodiment, 1/24,000th of a second). The delayed signals are identified as R' and S'.

The real (R) and imaginary (S) signals are then multiplied with the outputs of delay lines 40 and 42, i.e. by R' and S' by multipliers 44 and 46. The outputs of multipliers 44 and 46 are applied to adder 48 to produce the baseband (modulating) signal U having a resolution of the interpolation period ($T_s$). Signal U is applied to a slicer 50 for recovery of raw data, which is turn is applied to a Universal Asynchronous Receiver Transmitter (UART) 52 for organization in accordance with the desired protocol (e.g. ASCII). No post detection filtering is required to remove double frequency terms. Expressed mathematically, for an interpolation point at time n:

$$U(n*T_s)=R(n*T_s)*R((n+N)*T_s)+S(n*T_s)*S((n+N-)*T_s) \quad (1)$$

The delay period in terms of an integral multiple of the interpolation period for delay lines 40 and 42 is calculated to produce the best possible separation between a received 1 and a received 0. During periods when data is not being transmitted (indicated by constant transmission of a carrier at the mark frequency, i.e. the frequency corresponding to 1), during which scanning for a start bit of a character is occurring, the delay interval corresponds to the period between execution of the demodulator process. The delay period is typically close to one half a baud period, but not necessarily exactly one half of the baud period. The frequency of execution of the filter processes are also reduced to the same rate since the demodulator process requires only one new set of computations each time it is done. During scanning for a start bit, each sample is used twice, once as a present period sample and a second time as the delayed sample. Because front end processing of the filter and the automatic gain control can be reduced from the sample rate to approximately twice the baud rate.

The underlying frequency shift keyed signal has a sinusoidal waveform with two periods, one period corresponding to the mark frequency and the second period corresponding to the space frequency. It is the sinusoidal character of the signal which allows demonstration mathematically that the frequency doubling effects of prior art FSK demodulators can be eliminated. The value for R equals $R(n*T_s)$ where n is the instant sample. Because the R corresponds to the sampled signal it too is sinusoidal:

$$R(n*T_s)=\cos(wnT_s) \quad (2)$$

where t is time and w is radian frequency.
R', or delayed R thus equals $$R'=R((n+N)*T_s)=\cos(wNT_s+wnT_s) \quad (3)$$

Similarly for the imaginary or phase shifted signals $$S(n*T_s)=\sin(wnT_s) \quad (4)$$

S', or delayed S thus equals $$S'=S((n+N)*T_s)=\sin(wNT_s+wnT_s) \quad (5)$$

The recovered baseband signal U is equal to the summation of S*S' and R,R' or $$U=\cos(wNT_s) \quad (6)$$

Assuming that the automatic gain control process 38 regulates the peak amplitudes of the sampled signal to unity, and because the DC output level is independent of time, the recovered baseband signal is strictly proportional to the detected frequency.

For any given frequency pair, an optimal value N can be computed to improve the robustness and noise tolerance of the demodulator process. The first criterion relates to selection on an N which will center the two demodulator output levels about zero. Thus the relationship $$\cos(W_c*N*T_s)=0 \quad (7)$$

where Wc equals the average of the mark and space radian frequencies, must be satisfied.

A second criterion relates to achieving maximum separation between the DC output levels for the mark and space frequencies. Because of limitations is resolution in digital sampling systems exact satisfaction of the two criteria is probably not possible and thus some trial values may be used. Selection of a given N may lead to detection of frequencies other than the desired pair. Thus FIR filters may require adjustment to eliminate the undesired frequencies. This situation is a particular consequence where the demodulator of the present invention is utilized for tone detection.

Figure 4:
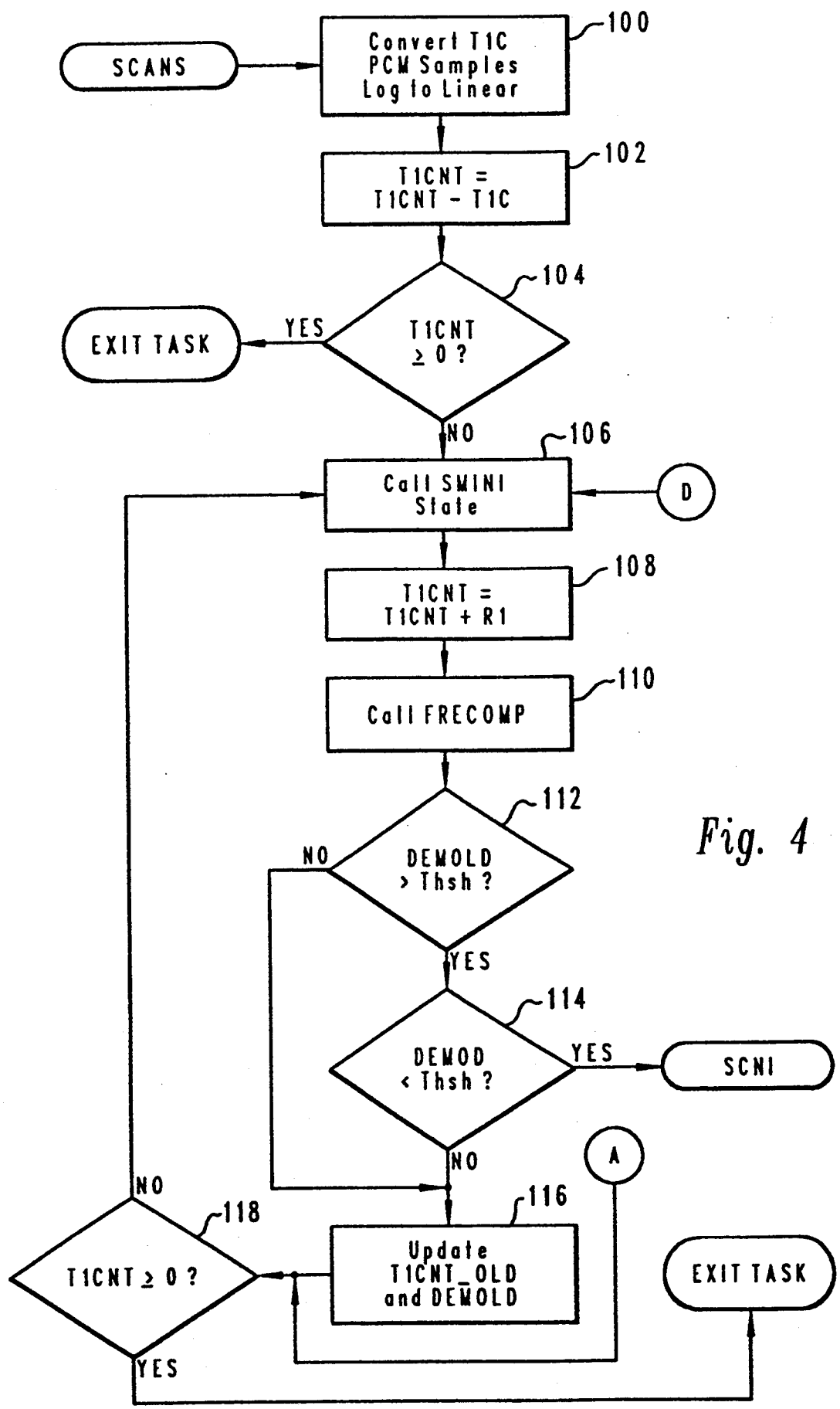
FIG. 4 is a high level flow diagram of a process for implementing the system and method of the invention.

FIGS. 4–9 are logical flow charts of a frequency shift keyed demodulation process for execution on a digital signal processor. FIG. 4 illustrates a process (SCANS) utilized for locating a prospective start bit for a character. The start bit will be a zero occurring after a relatively long series of ones. The demodulation process produces a baseband signal which may be compared against a threshold, which if it exceeds indicates the occurrence of a one and which if is below indicates the occurrence of a zero. The process assumes that a data is provided from a central switching office over a T1 digital trunk line in the form of compressed pulse code modulation. The process is entered from a digital signal processor operating system kernel at block 100 with conversion of T1C samples. Blocks 102 and 104 are executed to determine if the number of converted samples TIC since the last task call is sufficient in quantity to permit filtering to proceed. TICNT is a counter utilized in this determination. TICNT is initialized at a level to assure that sufficient TIC samples have been collected to permit filtering to proceed. TICNT is decremented as TIC samples are received and incremented as TIC samples are processed. If not, operation is returned to the operating system, which will return execution to SCANS after some period of time. A similar counter is described in detail in IBM Technical Disclosure Bulletin, Vol. 34, No. 8 (1992).

When enough sample points T1C have been collected, block 106 is executed, which is a call to SMINI. The SMINI procedure, which is described below, is provided to allow the use of different modem types, characterized by different baud rates. The call establishes certain pointers indicating the current phase, the number of sample points and other data required for determining receipt of a zero bit. Block 107 is also a reentry point to start bit scan mode from a data scan loop also described below. Next, block 108 is executed to adjust counter T1CNT for the number of samples for the current phase.

At block 110 the FRECOMP subprocess is called. FRECOMP is where actual demodulation occurs. FRECOMP is described below with reference to FIG. 6. FRECOMP returns two values, DEMOLD and DEMOD, which respectively represent the baseband value of the received signal at a period in the past and at the current period. The period between compared values is equal to one delay period $N^*T_s$. Because we are in scanning mode, the value of DEMOLD should always correspond to 1, that is it should be above a threshold value. Block 112 is executed to assure that this is the case. If DEMOLD is greater than the threshold value, block 114 is executed to determine if the baseband value of the current sample is below the threshold. If yes, a possible start bit has been located, subject to confirmation. A process SCNI is called (the YES branch) for purposes of confirmation.

If the baseband value of the current sample is greater than the threshold, or if DEMOLD was less than the threshold, the sample is not a start bit. Block 116 is executed to update the value of T1CNTOLD to equal the current T1CNT, and DEMOLD, which is set equal to the current DEMOD. Next, block 118 is executed to determine if sufficient samples remain to continue scanning for a zero threshold. If not, (the YES branch) the scanning task is exited to the operating system. If sufficient samples remain however, (the NO branch) the process is looped back to block 106. Block 118 is also the reentry point to the scanning routine from the confirmation routine SCNI, where SCNI has failed to confirm that a prospective start bit was a start bit.

Figures 5, 6:
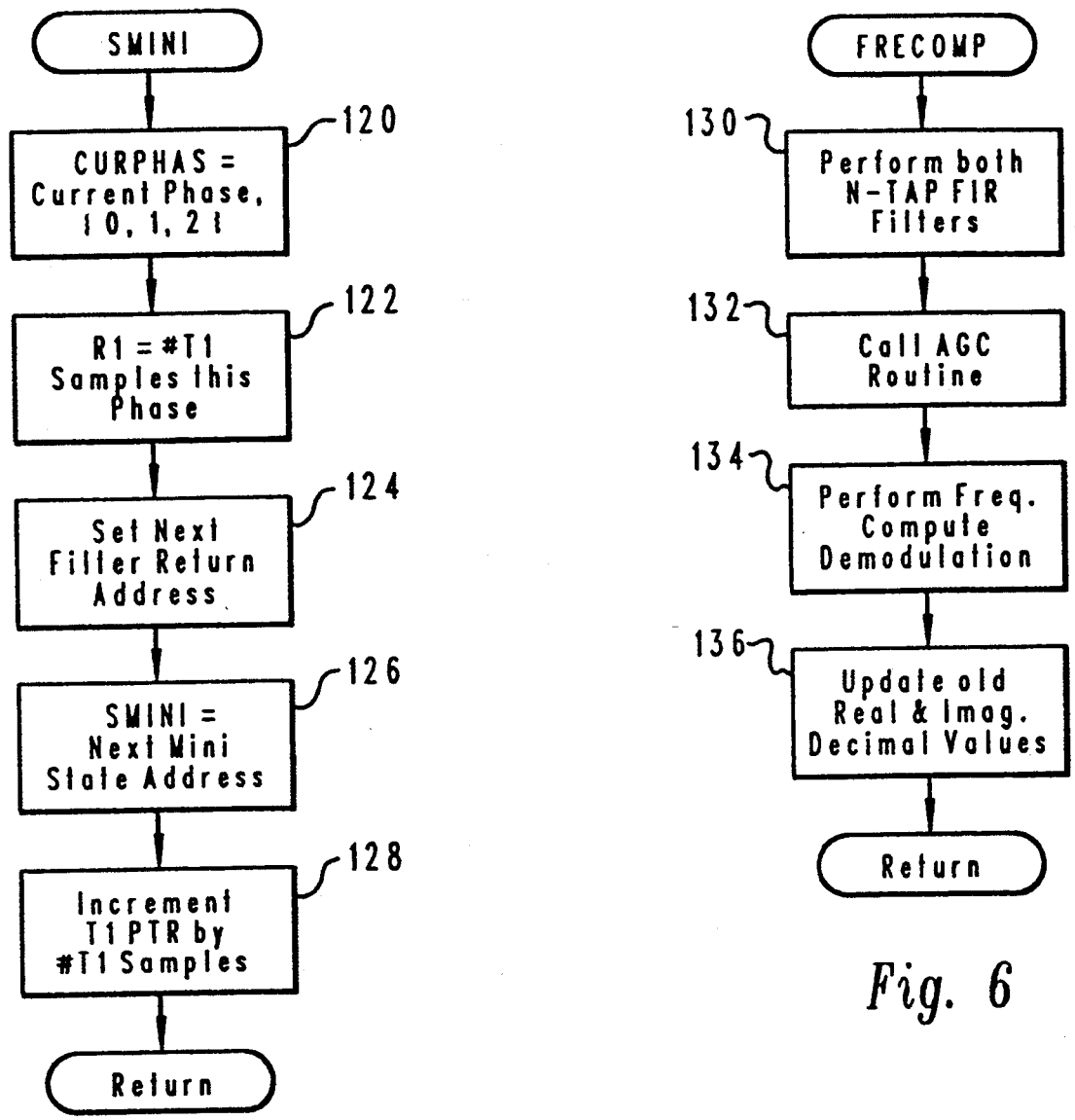
FIG. 5 is a high level flow diagram of a process for implementing the system and method of the invention.
FIG. 6 is a high level flow diagram of a process for implementing the system and method of the invention.

FIG. 5 illustrates the SMINI process. As stated previously, the presence of SMINI allows the processing of data signals received from different modem types. In the preferred embodiment the sampling rate is 8 Khertz. With interpolation the apparent sampling rate is increased to 24 Khertz. Two interpolation points are interposed each actual sample point (as shown in FIG. 3). The process is entered at block 120 where the current phase is identified. A separate SMINI actually exists for each phase. A current phase of 0 indicates that the current sample point is an actual sample, a current phase of 1 indicates that the current sample point is the first interpolation point after an actual sample point, and a current phase of 2 is set if the current sample point is the second interpolation point after an actual sample point. For increasing resolution more phases could be provided.

Next block 122 is executed to determine the number samples for the phase. Next block 124 is executed is set filter routing addresses depending upon the current phase. At block 126 the next SMINI address is set for the next phase (i.e. the SMINI process to be next called is identified). Next at block 128 a counter T1PTR is incremented by the number of samples and process control is returned to the block in SCANS or YLOOP (See FIG. 8) from which it was called. T1PTR is a pointer into the delay lines identifying the current actual (8 KHz) samples.

FIG. 6 illustrates the FRECOMP or frequency computation process. FRECOMP is entered at block 130, whereupon both N-tap FIR filters 34 and 36 are computed. The results (i.e. the R and the S signals) from the FIR calculation are adjusted in accordance with an automatic gain control process (block 132) to equalize peak to peak amplitudes of the signal with a desired level. Next at block 134 the frequency computation demodulation is performed. This involves multiplication of the value of the current sample point with delayed values R' and S' for the R and S signals. The delayed values are the calculated values for the R and S signals from the previous execution of FRECOMP, which will have occurred $N^*T_s$ interpolation periods previously. The baseband signal is gotten by summing the results of the multiplications. At block 136 the values for R' and S' are updated to equal the current R and S. U and U' are returned to the calling task as DEMOD and DEMOLD, respectively.

Figure 7:
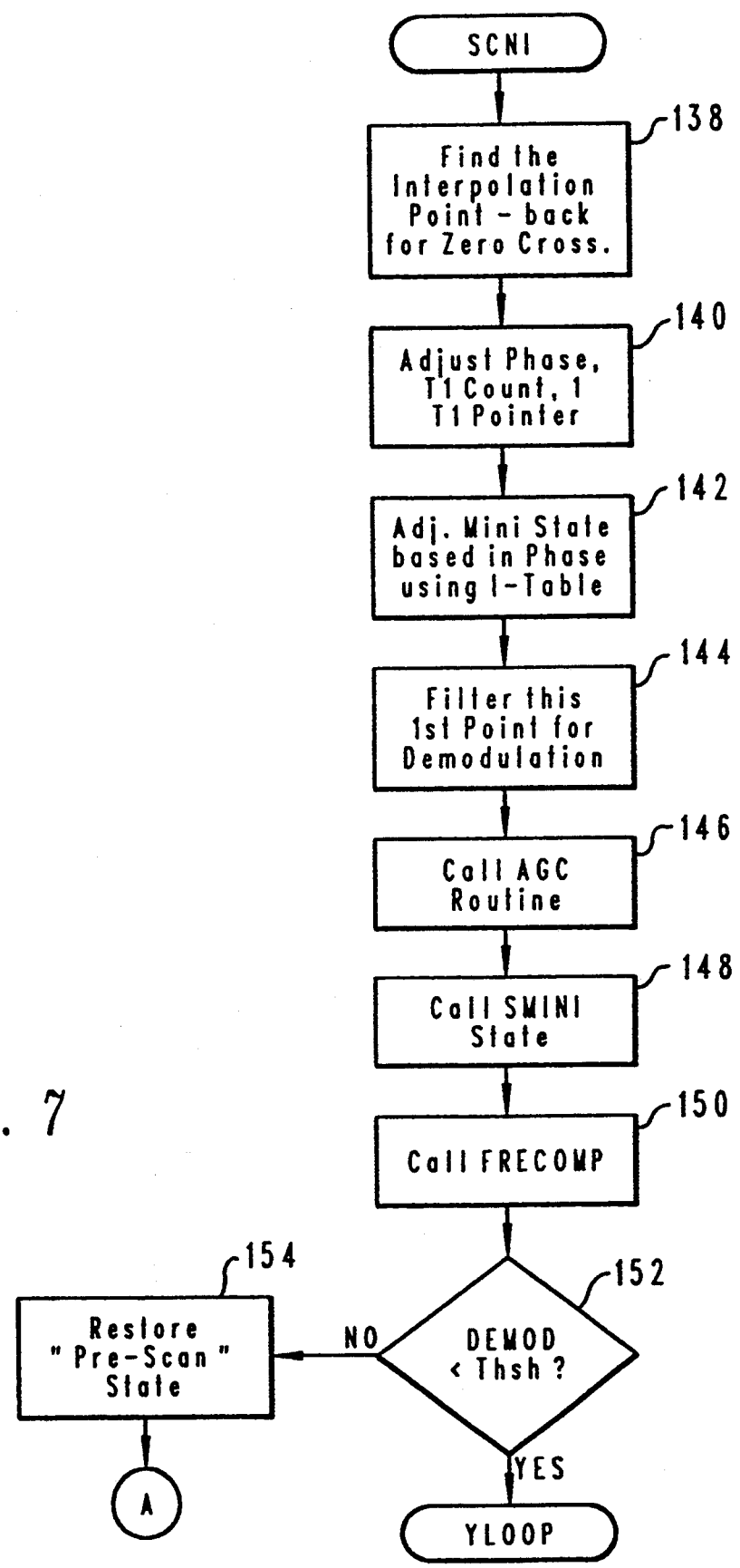
FIG. 7 is a high level flow diagram of a process for implementing the system and method of the invention.

FIG. 7 illustrates the SCNI process utilized for among other functions the confirmation of receipt of a zero start bit for a character. The process is the subject of a copending patent application Ser. No. 07/886,674, now U.S. Pat. No. 5,263,054, filed on even data herewith. The process is entered at block 138 where the number of sample points back to the nearest sample point to occurrence of the zero crossing is determined. For reasons which are the subject of the copending patent application, the center point of the start and all subsequent data and stop bits is utilized for demodulation. The center point of a bit is considered to be the most reliable sample or interpolated sample for generating a comparison value for comparison to the threshold. The zero crossing, which should occur at approximately one half a baud period before the center point must be located to determine the center of the prospective start bit. Next, at block 140 pointers to sample points corresponding to the estimated center position of the start bit, and to a sample point one delay period $(N^*T_s)$ prior to the center bit are determined. The phase is adjusted for demodulation of the estimated center point using the center sample and the delay sample.

Next at block 142, an SMINI state for demodulation of the identified sample is created. Next, at block 144 both the real and imaginary FIR filters are applied to the estimated center sample. The results of both filtering operations are adjusted for gain (block 146). Next, at block 148 the SMINI state is called to bring it up to the potential start bit. Next, at block 150, FRECOMP is called to return a recalculated value for DEMOD. At step 152, the recalculated DEMOD is compared with Threshold T to determine if it less than zero. If the value calculated for DEMOD at the estimated center point is less than threshold we confirm detection of a start bit by advancing execution into a data mode represented by routine YLOOP. If DEMOD is greater than or equal to Threshold, block 154 is executed to restore all pointers to their state prior to entry to SCNI and execution is returned to SCANS at block 118.

Figure 8:
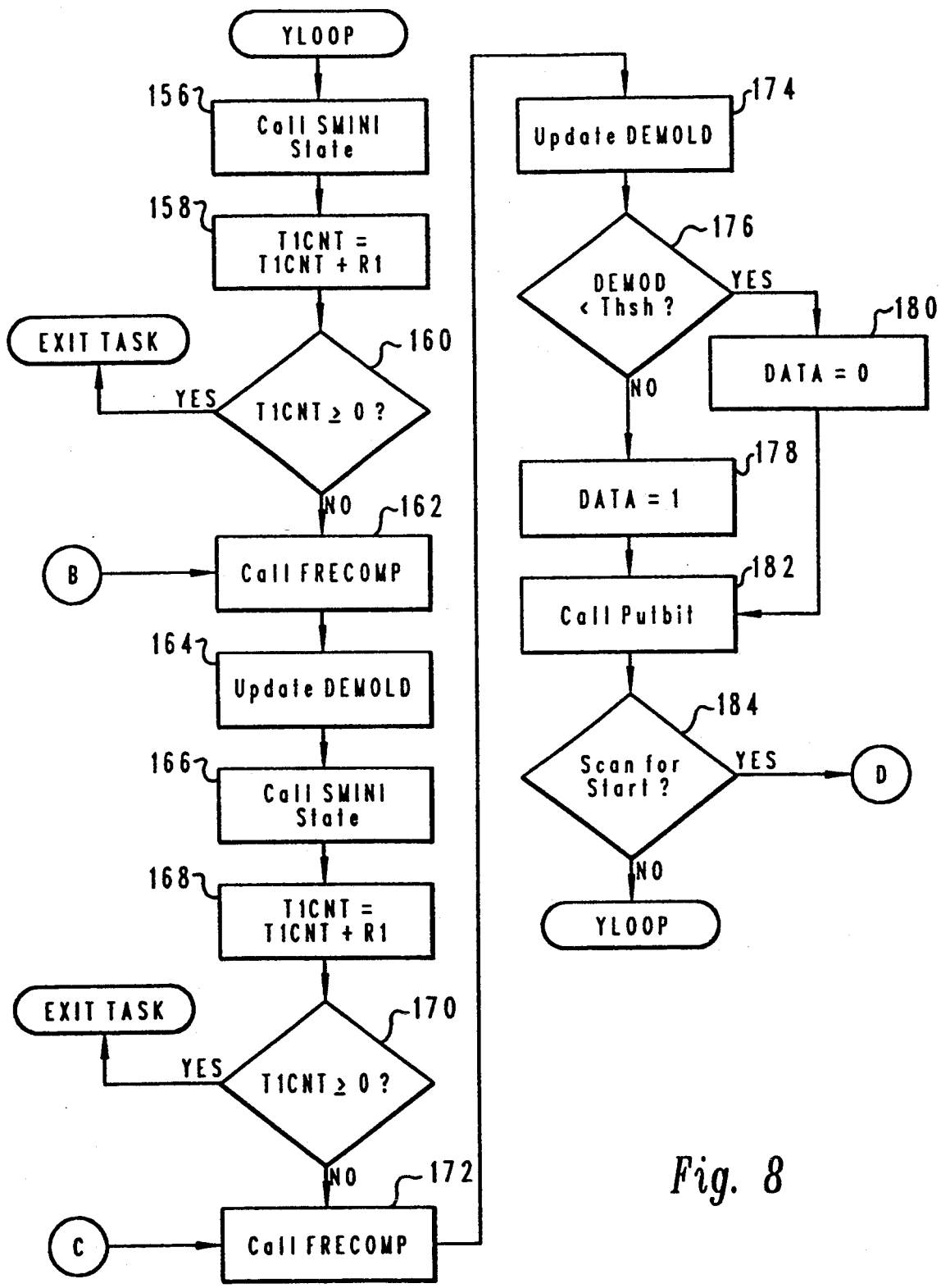
FIG. 8 is a high level flow diagram of a process for implementing the system and method of the invention.

FIG. 8 illustrates a logical flow chart for the process of scanning for data bits. YLOOP is entered at block 156 with a call for SMINI state, which is different than that for scanning mode. The differences relate to adjustments made to assure demodulation of center points of data bits, and are described in more detail in copending application Ser. No. 07/886,674 now U.S. Pat. No. 5,263,054. At block 158 the counter T1CNT is set to the inherited value of T1CNT plus the current number of sample points. A fail-safe check is performed at block 160 to assure that a sufficient number of samples have been collected for filtering to proceed. If not, YLOOP is exited (the NO branch) to the DSP operating system, which will cause reentry to YLOOP at block 162 by way of the SYNC procedure after some delay to allow collection of sample points sufficient to support filtering.

When sufficient sample points have been collected, block 162 is executed to call FRECOMP. FRECOMP demodulates a sample point representing a point occurring one delay period prior to the center point for the next data bit. The returned value is utilized to update DEMOLD at block 164.

At block 166, SMINI is called again for the center point of the incoming data bit. Blocks 168 and 170 are executed to determine if sufficient data points have been collected to permit filtering of the data bit center point. If not, YLOOP is exited to SYNC through the operating system to permit sufficient points to be collected for filtering. Block 172 is executed if sufficient samples are available, or once they become available. Block 172 is a call to FRECOMP to demodulate the center sample for the current data bit. Next, block 174 is executed to update DEMOLD to equal the DEMOD returned from block 172 in anticipation of the next demodulation step.

Blocks 176–182 represent the operation of slicer 50. At block 176, DEMOD is compared to Threshold to determine if the current bit is a 1 or a 0. If it is a 1, block 178 is executed to set a variable DATA equal to 1. If a 0 is indicated, block 180 is executed to set the variable DATA equal to 0. Then block 182 is executed to call a routine called PUTBIT, which passes DATA to a protocol generator.

Lastly, block 184 is executed to determine if the number of bits required to define a character have been received (e.g. 10 where 8 bits define an ASCII character, one bit is a parity bit and one bit is a stop bit). If all anticipated bits have received, control is returned SCANS at block 106, indicated by the connector D. If insufficient bits have been decoded to complete a character, YLOOP is continued at its beginning.

Figure 9:
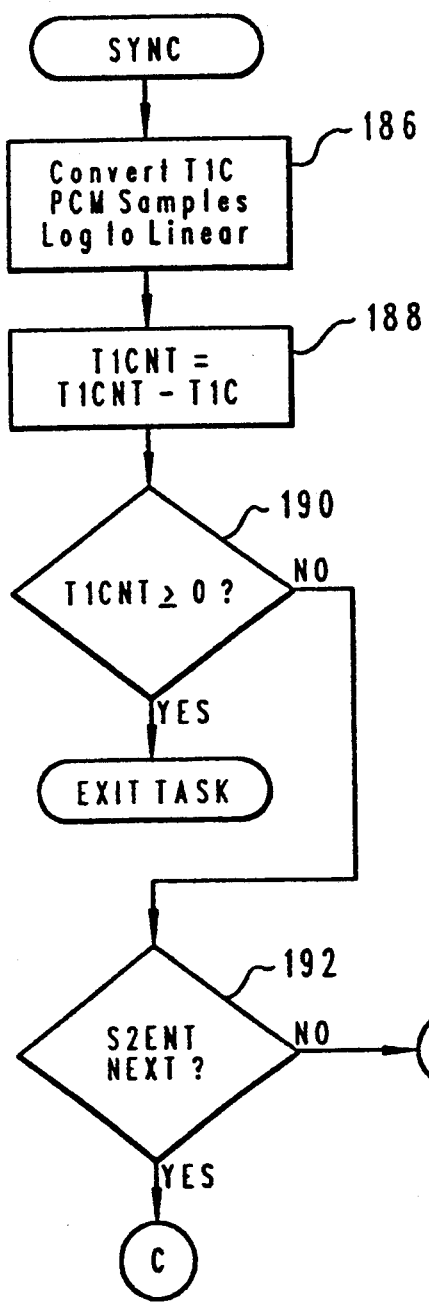
FIG. 9 is a high level flow diagram of a process for implementing the system and method of the invention.

FIG. 9 is a flow chart illustrating the SYNC process, which controls reentry to YLOOP from the digital signal processor operating system kernel. SYNC has two functions: (1) determining if enough samples have been received to execute the filters (determined at blocks 186, 188, and 190); and (2) if sufficient samples are available, returning execution of the process to the appropriate point of the YLOOP process indicated at continuation letters B and C (determined at block 192). If too few samples are available to execute the filters, decision block 190 returns processing to the operating system.

Figure 10:
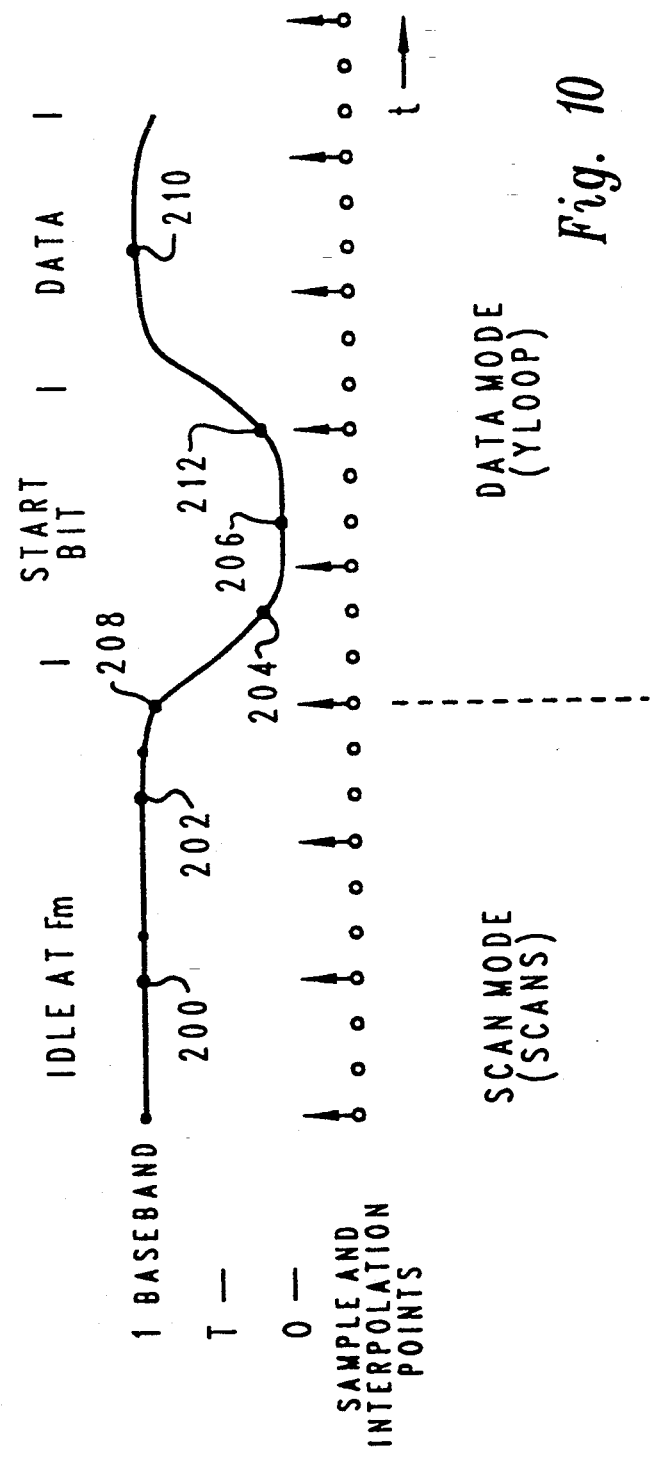
FIG. 10 is a graphical illustration of recovery of a baseband signal.

FIG. 10 is a graphical illustration of the timing of events in demodulating a baseband signal, including determination of a start bit. Underlying the X-axis is a time graph of sample (indicated by a circle and arrow) and sample interpolation points (indicated by circles). For purposes of filtering, sample interpolation points are treated as sample points. On the Y-axis are indicated the relative levels of the baseband signal representing 0, 1, and a threshold level (T). The baseband signal is indicated as a solid line. The timing of filtering of sample values from the received signal is indicated as points 200–212 along the baseband signal.

Initially the process is in the SCANS or scanning mode. Demodulation of points 200, 202 and 204 occurs during this mode. Because the value of the baseband signal at point 204 falls below T, the SCANS process detects the presence of the start bit. Control is transferred to SCNI for confirmation that a start bit has been located and to adjust the demodulation routine to assure demodulation of samples at or nearly at the center of the start and subsequent data bits. The sample point nearest the threshold crossing for the start bit is located and the center point 206 of the start bit is determined by advancing one half baud period from the threshold crossing. From center point 206 a second filter point 208 one $N*T_s$ delay period prior to occurrence of the center point is recovered for utilization in demodulating the point 206.

As a result of prior identification of the modem type, and its baud rate, the center points of subsequent data points (e.g. point 210) is known. Once a start bit has been detected, front end filtering (the FIR filters 34 and 36) is adjusted on the middle of the baud period. Subsequent processing is synchronized to the baud rate until scanning mode is returned to. Data bits subsequent to the start bit are demodulated in a manner similar to the start bit, except that determination of the threshold crossing is no longer needed. The data bit center point 210 and a sample (or sample interpolation) point 212 occurring one $N*T_s$ delay period prior to the center point are filtered and utilized for demodulation of the baseband signal at center point 210. Thus exactly two passes through the filters and the automatic gain control process are required for each baud period, and only one pass through the demodulator process. This represents a substantial reduction in the frequency of computation over the prior art.

Figure 11:
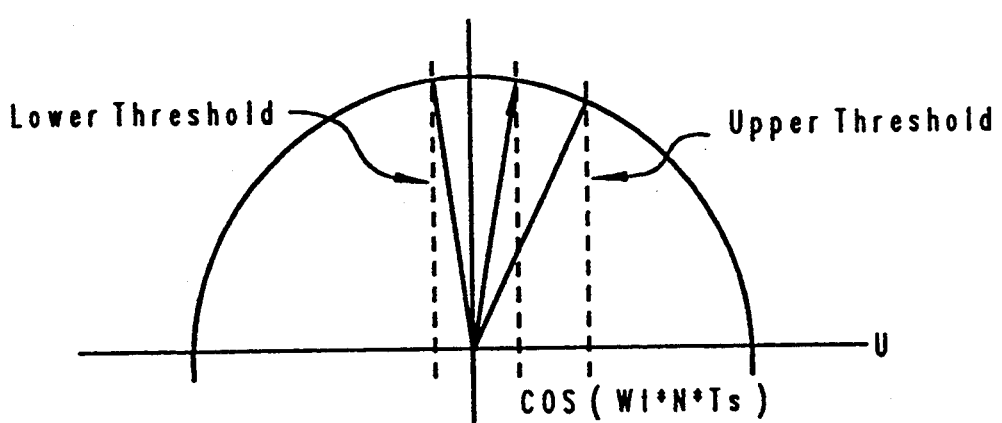
FIG. 11 is a graphical illustration of establishment of thresholds for detection of frequency tones.

FIG. 11 illustrates implementation of frequency tone detection on the system of FIG. 2. The frequency shift keying demodulator of the present invention may also be applied to tone detection. Where used for tone detection the relationship $$\cos(W_t*N*T_s)=0 \qquad (8)$$

where $W_t$ is the radian frequency of the tone to be detected, must be substantially satisfied. Adjustable upper and lower thresholds are provided for qualifying a detected tone. Again exact satisfaction of equation (8) may not be possible because of lack of resolution stemming from the sample period. Tone detection may be used to identify the type and baud rate of a transmitting modem because certain frequencies are associated with those modems.

While the invention has been particularly shown and described with reference to a preferred embodiment, it will be understood by those skilled in the art that various changes in form and detail may be made therein without departing from the spirit and scope of the invention.

What is claimed is:

1. A signal frequency detector comprising:
   first and second signal processing paths terminating for summation at a summing junction;
   means for applying a sampled signal to the first and second signal processing paths;
   the first and second signal processing paths each including a serially coupled finite impulse response filter means for filtering out energy outside a selected bandwidth, automatic gain control means for adjusting peak values of the sampled signal to unity and a detection section;
   the finite impulse response filter means for the second signal processing path further including means for shifting the phase of the sampled signal approximately 90 degrees relative to the sampled signal in the first signal processing path;
   the detection section in each signal processing path including first and second subpaths terminating for multiplication in a multiplying junction, the first subpath including a tunable delay line; and
   comparing means for comparing an input from the summing junction with a direct current level to detect at least a first received signal frequency.

2. A signal frequency detector as set forth in claim 1, wherein the comparing means compares the input from the summing junction for its sign against the direct current level to detect mark and space frequencies of a frequency shift keyed received signal.

3. A signal frequency detector as set forth in claim 2 wherein the means for applying a sampled signal includes an analog to digital converter.

4. A signal frequency detector as set forth in claim 2 wherein the means for applying a sampled signal includes means for converting a digitized, compressed pulse code modulated data to linear pulse code modulated data.

5. A method of efficiently detecting at least a first frequency from a received signal utilizing a digital signal processor, the method comprising the steps of:
   sampling the received signal to produce a real sampled signal;
   generating a phase shifted signal from the real sampled signal;
   filtering selected samples from the real sampled signal to remove selected components outside a selected frequency range;
   filtering selected samples from the phase shifted signal to remove selected components outside a selected frequency range;
   adjusting the peak value of the real sampled signal and the peak value of the phase shifted signal to unity;
   multiplying two samples from the real sampled signal to produce a real product, one of the two samples comprising a time delayed sample from the real sampled signal;
   multiplying two samples from the phase shifted signal to produce a phase shifted product, one of the two samples comprising a time delayed sample from the phase shifted signal;
   summing the real and the phase shifted products to reproduce a baseband signal; and
   comparing the reproduced baseband signal to a signal level to detect the first frequency.

6. A method of efficiently detecting at least a first frequency from a received signal utilizing a digital signal processor as set forth in claim 5, wherein the step of comparing includes comparing the recovered baseband signal to the signal level to determine the sign of the recovered signal and assigning a value of 1 or 0 to the recovered baseband signal depending upon the determined sign.

7. A method of efficiently detecting at least a first frequency from a received signal utilizing a digital signal processor as set forth in claim 6, wherein the sampled signal relates to a frequency shift keyed signal having a baud rate and the filtering and peak value adjusting steps are executed at a frequency twice the baud rate.

* * * * *